United States Patent Office 3,250,119
Patented May 10, 1966

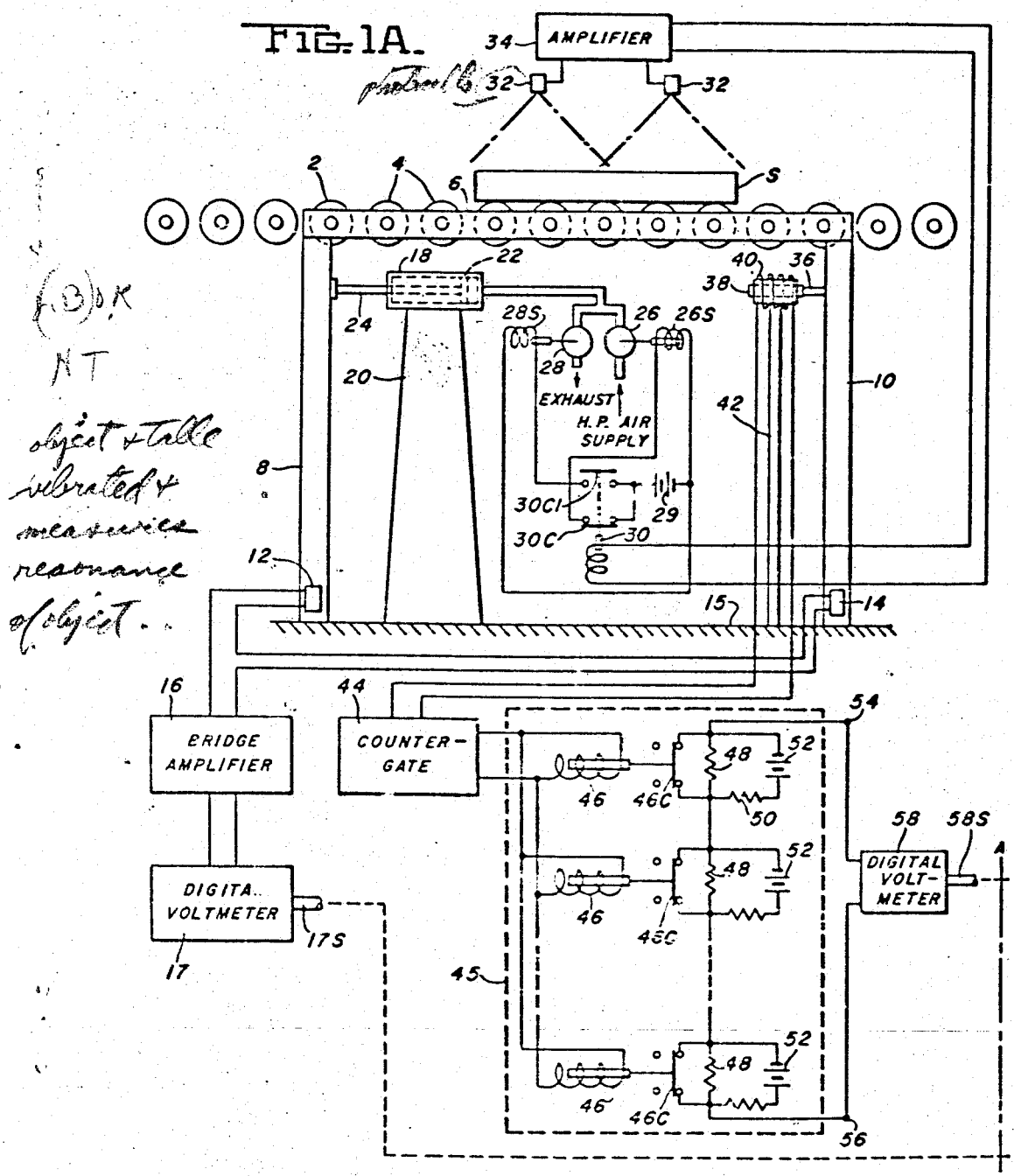

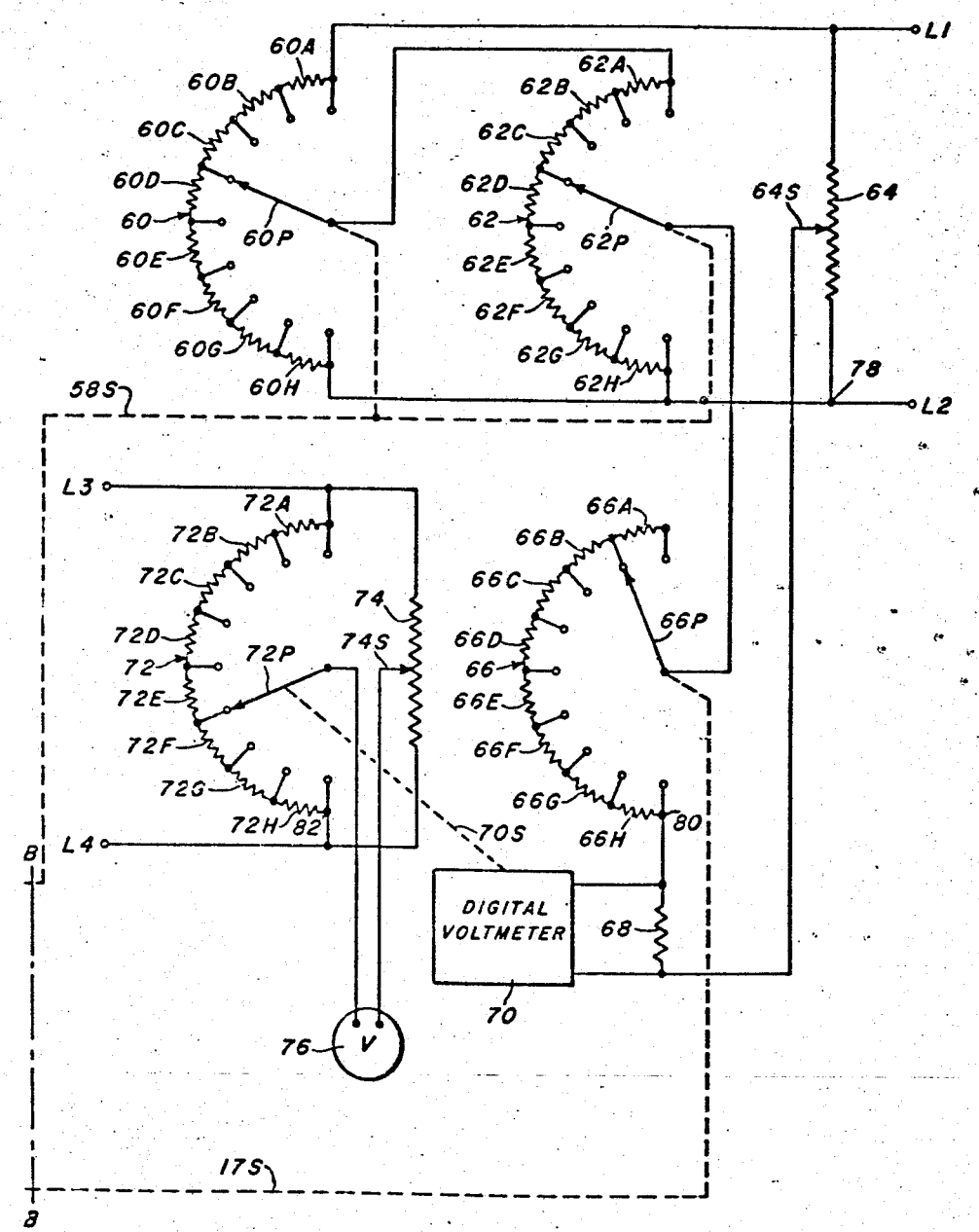

3,250,119
METHOD AND APPARATUS FOR MEASURING THE THICKNESS OF AN OBJECT
William L. Roberts, Murrysville, Pa., assignor to United States Steel Corporation, a corporation of Delaware
Filed June 28, 1962, Ser. No. 206,029
7 Claims. (Cl. 73—67.2)

This invention relates to a method and apparatus for measuring the thickness of an object and more particularly to measuring the thickness of a slab of steel being fed to a rolling mill. When a slab of steel is removed from the heating furnace it is first conveyed to a scale breaker before being further processed in a hot rolling mill. If the roll gap of the scale breaker is not set at approximately the thickness of the slab, breakage of the rolls and other parts of the scale breaker often occurs. This difficulty may be mitigated if the thickness of each slab is measured as the slab emerges from the heating furnace and if the roll gap in the scale breaker is set accordingly. Various existing thickness measuring devices are unsatisfactory for this purpose. Devices utilizing optical techniques are inaccurate due to the steam and dust which surrounds the slab at this point. Contacting devices have the disadvantage that only the thickness at a single point is measured. X-ray and radioisotopic gaging are not satisfactory because the thickness of the steel to be measured is approximately 3 to 20 inches which is beyond the useful operating range of a radiation-type gage.

It is therefore an object of my invention to provide a method of measuring the thickness of an object without contacting it.

Another object is to provide apapratus for measuring the thickness of an object without contacting it.

A further object is to provide such apparatus that will measure the average thickness of an object in such manner that the effects from small surface variations will not cause inaccuracies.

These and other objects will be more apparent after referring to the following specification and attached drawings, in which:

FIGURES 1A and 1B, when united on the lines A—A and B—B form a schematic view of the apparatus of my invention.

Referring more particularly to the drawings, reference numeral 2 indicates a roller conveyor which transports a slab of steel S from a reheating furnace to a scale breaker or other apparatus, not shown. The conveyor 2 includes a plurality of rolls 4 which are supported in conventional bearings, not shown, on a horizontal member 6 and are driven by conventional means, not shown. The member 6 is supported by vertical members 8 and 10 which have conventional load cells 12 and 14, respectively, therein. The members 8 and 10 are preferably made of steel so that they have elasticity and are supported at floor level 15. The members bearing the reference numerals 6 through 14, inclusive, are duplicated with respect to the other end of rolls 4, but because they are identical, they are not shown. The load cells 12 and 14 are connected in series to a conventional bridge amplifier 16 which produces an output voltage proportional to the weight of the slab S. An example of a suitable bridge amplifier 16 is Model No. BAM-1, manufactured by Ellis Associates of Pelham, New York. The output of amplifier 16 is connected to a conventional digital voltmeter 17 utilizing a rotary stepping switch having a shaft 17S which assumes an angular position corresponding to the weight on the loaded table. The voltmeter 17 may be a Model No. 4510 RDP of Electro Instruments, Inc., San Diego, California.

A pneumatic cylinder 18 is rigidly supported by a member 20 and has a piston 22 which carries piston rod 24. The free end of the rod 24 is adapted to contact the vertical member 8 when air under pressure is supplied to cylinder 18 through solenoid valve 26 having an operating solenoid 26S. Air is exhausted from the cylinder 18 through a solenoid valve 28 having an operating solenoid 28S. Power from a power source 29 is supplied to the solenoid 26S through a normally closed contact 30C of a relay 30 which also has a normally open contact 30C1. Power source 29 is connected to solenoid 28S through contact 30C1. A plurality of phototubes 32 are mounted above the rolls 4 and respond to the presence of the hot slab S. Phototubes 32 are connected to a conventional amplifier 34, the output of which is connected to the coil of relay 30.

One end of a rod 36 is rigidly attached to the member 10 and the other end has a permanent magnet 38 attached thereto. A coil 40 is supported by a member 42 extending to the floor 15 and is so arranged that its turns encircle the magnet 38 and are free to move with respect thereto. Each end of coil 40 is connected to the input of a counter-gate unit 44 which may be a conventional device such as Model No. 7160 described at page 1–2 of Catalogue 705, 1957, of the Beckman-Berkeley Division of Beckman Instruments, Inc. To the binary outputs of the counter-gate unit 44 is connected a digital to analog converter 45 which comprises a plurality of relay coils 46, each having a normally closed contact 46C. A resistor 48 is connected across each contact 46C in parallel with a series combination of a resistor 50 and a battery 52. Each parallel combination is then connected in series with the others so as to produce at output terminals 54 and 56 a voltage proportional to the count registered by the counter-gate 44. The counter-gate 44 amplifies the sinusoidal vibration signal developed by magnet 38 and coil 40 and one half cycle of the amplified signal is used as a gating impulse in a circuit of the counter-gate 44 so that the circuit which receives impulses at a high repetition rate is opened for the duration of the gating pulse. Thus the number of high frequency impulses passing through the circuit is proportional to the period of the vibration. These high frequency impulses are then fed to the normal counting circuits of the counter-gate. The counter-gate includes circuits for storing the digital information, these being connected to the relays 46.

A conventional digital voltmeter 58, utilizing a rotary stepping switch having a shaft 58S, is connected to terminals 54 and 56. The voltmeter 58 may be similar to voltmeter 17 and the shaft 58S assumes an angular position corresponding to the period of oscillation of the table 6.

The computational circuit shown in FIGURE 1B includes rotary switches 60 and 62 having their poles 60P and 62P ganged together and mechanically connected to shaft 58S. Switch 60 includes resistors 60A, 60B, 60C, 60D, 60E, 60F, 60G and 60H which are preferably of equal value. The terminals of switch 60 are connected to a D.C. power source L1, L2 having a voltage V1. The switch 62 includes resistors 62A, 62B, 62C, 62D, 62E, 62F, 62G and 62H preferably of equal value. Pole 60P is connected to one terminal of switch 62 and the other terminal of switch 62 is connected to line L2. A potentiometer 64 having slider 64S is connected across the terminals of switch 60. A rotary switch 66 has its pole 66P connected for rotation with shaft 17S. Pole 66P is electrically connected to pole 62P. Switch 66 includes resistors 66A, 66B, 66C, 66D, 66E, 66F, 66G and 66H preferably of equal value. The terminal of switch 66 adjacent resistor 66H is connected to slider arm 64S through a resistor 68. A conventional digital voltmeter 70 is connected across resistor 68. The digital voltmeter 70 may be of the same type as voltmeter 17 and is provided with a shaft 70S mechanically connected to pole 72P of a rotary switch 72 which has resistors 72A, 72B, 72C, 72D, 72E, 72F, 72G and 72H, all preferably of equal value. The terminals of switch 72 are connected to a D.C. power source L3, L4 having a voltage V2. A potentiometer 74 having a slide wire 74S is also connected across the terminals of switch 72. The pole 72P and slider 74S are connected to a voltmeter 76.

The basis of the measurement of thickness is as follows: Assuming that the moment of inertia of the table 6 without the workpiece S thereon about the base of its legs 8 and 10 is JE and the restoring torque per unit of angular displacement of legs 8 and 10 caused by their elasticity is T then the period of oscillation PE of the empty table is given by the equation:

$$PE = 2\pi \sqrt{\frac{JE}{T}} \qquad \text{Equation 1}$$

When the workpiece S is supported on the table the moment of inertia of the assembly is increased by a quantity $M(L+d/2)^2$ where M is the mass of the workpiece, L is the height from the floor to the bottom surface of the workpiece and $d$ is the thickness of the workpiece. Thus, when the workpiece is on the table the period of oscillation PL is given by the equation:

$$PL = 2\pi \sqrt{\frac{JE + M(L+d/2)^2}{T}} \qquad \text{Equation 2}$$

By combining Equations 1 and 2 the following equation is obtained:

$$d = 2\left[\sqrt{\frac{JE}{M}\left(\frac{PL^2}{PE^2} - 1\right)} - L\right] \qquad \text{Equation 3}$$

In operation, the positions of the poles 60P and 62P are proportional to the period of oscillation PL of the table and slab since the poles are connected to the shaft 58S. Thus, the potential difference between the pole 60P and the end of resistor 60H is proportional to PL when the resistors 60A to 60H are of equal value. The potential difference between the pole 62P and the end of resistor 62H is proportional to $PL^2$. The slider 64S of the potentiometer 64 is adjusted so that the potential between it and point 78 is proportional to $PE^2$. Hence, the potential difference between poles 62P and slider 64S is made proportional to $PL^2$ minus $PE^2$. This signal is applied to the circuit consisting of switch 66 and resistor 68. Since the angular position of the pole 66P is proportional to the weight M of the slab, the resistance between pole 66P and point 80 is made proportional to the weight M of the workpiece and since the resistor 68 has a relatively small value the current in the circuit is proportional to $$\frac{PL^2 - PE^2}{M}$$

The resistors 72A to 72H are selected so that the switch 72 is in effect a non-linear potentiometer with the voltage appearing between the pole 72P and point 82 being proportional to $$\sqrt{\frac{PL^2 - PE^2}{M}}$$

By suitable choices of circuit parameters the voltage between pole 72P and point 82 is made equivalent to $$\sqrt{\frac{JE}{M}\left(\frac{PL^2}{PE^2} - 1\right)}$$

since JE and PL are constants for given equipment. The slider 74S is set so that the potential between point 82 and slider 74S is equivalent to L. Therefore, a signal exists between pole 72P and slider 74S which is proportional to $$\sqrt{\frac{JE}{M}\left(\frac{PL^2}{PE^2} - 1\right)} - L$$

This signal is applied to the voltmeter 76 which is so calibrated that its reading is representative of the thickness of slab S. It will be seen that the configuration of the object is such that its center of mass when on the support is in a plane parallel to the support a distance therefrom of known proportion to the lineal dimension being measured. When measuring the thickness of an object having a rectangular cross section, such as a slab, this distance will be one half the thickness of the object.

While movement of the slab S onto the table 6 should cause sufficient vibration so that it would be measured by means of the vibration pick-up 36, 38 and 40 the vibration means 18, 22 and 24 is preferably used. Thus, when a hot slab S is received on the table 6 the phototubes 32 will be activated and the signal therefrom will be amplified by amplifier 34 and will energize the coil of relay 30, thus closing contact 30C1 and opening contact 30C. Closing of contact 30C1 energizes solenoid 28S, thus exhausting air from cylinder 18. Opening of contact 30C deenergizes solenoid 26S so as to close valve 26. When the table 6 is not supporting a hot workpiece the phototubes 32 will be deenergized and the contacts 30C closed and contacts 30C1 open so that the table is strained by the pressure of the piston rod 24. Thus, release of this pressure will cause vibration of the table 6.

While one embodiment of my invention has been shown and described, it will be apparent that other adaptations and modifications may be made without departing from the scope of the following claims.

I claim:

1. Apparatus for measuring a lineal dimension of an object comprising an elongated support for said object with the configuration of the object so supported being such that its center of mass is in a plane parallel to said support a distance therefrom of known proportion to the said lineal dimension, elastic means attached to said elongated support adjacent the ends thereof and extending therefrom generally normal thereto, means for weighing said object, means for oscillating said supported object in a plane generally normal to the dimension to be measured, means for measuring the period of oscillation of said object, and means responsive to said weighing and measuring means for computing the said lineal dimension of said object.

2. Apparatus for measuring the thickness of an object comprising an elongated generally horizontal support for said object with the configuration of the object so supported being such that its center of mass is in a plane parallel to said support a distance therefrom of known proportion to the said lineal dimension, a generally vertical elastic support attached to said elongated support adjacent the ends thereof and extending downwardly therefrom, means for weighing said object, means for oscillating said support and said supports in a generally horizontal plane, means for measuring the natural frequency of oscillation of said object and said supports, and means responsive to said weighing and measuring means for computing the average thickness of said object.

3. Apparatus according to claim 2 in which said computing means comprises means for converting the output of said measuring means into a voltage, means responsive to said converting means for squaring said voltage, means for producing a voltage proportional to the square of the period of the natural frequency of oscillation of said supporting means, means responsive to said last two means for producing a voltage proportional to the difference between said last two means, means responsive to said weight determining means for attenuating the signal produced by said last named means by an amount proportional to the output of said weighing means, means responsive to said attenuating means for generating a signal proportional to the square root of the output of said attenuating means, means for generating a signal proportional to the height at which said object is supported by said supporting means, means responsive to said last two means for producing a voltage proportional to the difference between said last two means, and means responsive to the last said means for visually displaying the magnitude of the signal produced by said means.

4. Apparatus for measuring the thickness of an object according to claim 2 in which said weighing means includes load cells connected to said vertical elastic support.

5. The method of measuring a lineal dimension of an object which comprises weighing said object on a support with the configuration of the object being such that its center of mass is in a plane parallel to said support a distance therefrom of known proportion to the lineal dimension, oscillating said object in a plane normal to the dimension to be measured, measuring the period of oscillation of said object, and correlating the weight and oscillation measurements to obtain the said lineal dimension of the object.

6. The method of measuring the thickness of an object which comprises placing said object on a support a known distance above a supporting base with the configuration of the object so placed being such that its center of mass is in a plane parallel to said support a distance therefrom equal to one half of the said thickness, weighing said object on said support, oscillating said object and support at their natural frequency in a plane normal to the said thickness, measuring the periods of oscillation of said object and support, and determining the thickness of said object according to the equation:

$$d = 2\left[\sqrt{\frac{JE}{M}\left(\frac{PL^2}{PE^2} - 1\right)} - L\right]$$

wherein
- $d$ = thickness of the object
- $JE$ = moment of inertia of the empty support about its supporting base
- $PE$ = period of oscillation of the empty support
- $PL$ = period of oscillation of the support and object
- $M$ = weight of the object
- $L$ = distance between the supporting base and bottom of the object.

7. Apparatus for measuring the thickness of an object comprising a generally horizontal support for said object with the configuration of the object so supported being such that its center of mass is in a plane parallel to said support a distance therefrom of known proportion to said lineal dimension, a generally vertical elastic support attached to said elongated support adjacent the ends thereof and extending downwardly therefrom, means for transporting said object to said horizontal support, means for measuring the period of the natural frequency of oscillation of said object and said supports, means for weighing said object, and means responsive to said weighing and measuring means for computing the average thickness of said object.

References Cited by the Examiner

UNITED STATES PATENTS

| | | | |
|---|---|---|---|
| 2,305,783 | 12/1942 | Heymann et al. | |
| 2,694,310 | 11/1954 | Pounds | 73—67 |
| 3,059,468 | 10/1962 | Rowe | 73—67.2 |
| 3,080,750 | 3/1963 | Wiley | 73—67.2 X |

RICHARD C. QUEISSER, Primary Examiner.

JOHN A. BEAUCHAMP, Examiner.

CHARLES A. RUEHL, Assistant Examiner.